US012384353B2

(12) United States Patent
Zhang et al.

(10) Patent No.: US 12,384,353 B2
(45) Date of Patent: Aug. 12, 2025

(54) VEHICLE BATTERY LIFE MANAGEMENT FOR ENERGY SOLUTIONS

(71) Applicant: Honda Motor Co., Ltd., Tokyo (JP)

(72) Inventors: Junlei Zhang, Long Beach, CA (US); Robert M Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 17/981,865

(22) Filed: Nov. 7, 2022

(65) Prior Publication Data
US 2024/0149860 A1    May 9, 2024

(51) Int. Cl.
| G08G 1/00 | (2006.01) |
| B60L 58/12 | (2019.01) |
| B60L 58/16 | (2019.01) |
| B60W 10/26 | (2006.01) |
| B60W 50/08 | (2020.01) |
| H02J 7/00 | (2006.01) |

(52) U.S. Cl.
CPC ............. *B60W 10/26* (2013.01); *B60L 58/12* (2019.02); *B60L 58/16* (2019.02); *B60W 50/08* (2013.01); *H02J 7/0048* (2020.01); *H02J 7/005* (2020.01); *H02J 7/0063* (2013.01)

(58) Field of Classification Search
CPC ....... B60W 10/26; B60W 50/08; B60L 58/12; B60L 58/16; B60L 53/63; B60L 55/00; H02J 7/0048; H02J 7/005; H02J 7/0063
See application file for complete search history.

(56) References Cited

U.S. PATENT DOCUMENTS

| 8,718,850 B2 | 5/2014 | Bozchalui et al. |
| 9,112,382 B2 | 8/2015 | Paul et al. |
| (Continued) | | |

FOREIGN PATENT DOCUMENTS

| JP | 2013093981 A | 5/2013 |
| JP | 5851731 B2 | 2/2016 |
| (Continued) | | |

OTHER PUBLICATIONS

M. Yilmaz and P. T. Krein, "Review of the Impact of Vehicle-to-Grid Technologies on Distribution Systems and Utility Interfaces," in IEEE Transactions on Power Electronics, vol. 28, No. 12, pp. 5673-5689, Dec. 2013, [now Yilmaz]. (Year: 2013).*

(Continued)

*Primary Examiner* — Joan T Goodbody
(74) *Attorney, Agent, or Firm* — Joshua Freier; American Honda Motor Co., Inc.

(57) ABSTRACT

A system and method for management of vehicle battery life is disclosed. The system is communicatively coupled to a vehicle and receives information associated with the vehicle. Based on the received information, the system determines a user of the vehicle as one of a lessee of the vehicle or an owner of the vehicle. The system sets a limit that is applicable on a consumption of charge cycles from a current cycle life of a battery unit of the vehicle. The limit is set based on the determination that the user is the owner of the vehicle. The system detects a connection of the vehicle with an electrical system of a built environment associated with the user and controls a transfer of electric power from the battery unit to the electrical system based on the detection and the set limit.

16 Claims, 5 Drawing Sheets

(56) References Cited

U.S. PATENT DOCUMENTS

| | | |
|---|---|---|
| 9,457,680 B2 | 10/2016 | Shinzaki et al. |
| 10,938,211 B2 | 3/2021 | Bell |
| 2020/0101850 A1* | 4/2020 | Harty ................. B60L 55/00 |

FOREIGN PATENT DOCUMENTS

| | | | | |
|---|---|---|---|---|
| JP | 6202674 B2 | | 9/2017 | |
| JP | 6220088 B1 | | 10/2017 | |
| JP | 2021180548 | * | 11/2021 | ............... H02J 7/00 |
| KR | 20210148759 A | | 12/2021 | |
| KR | 1020210148759 | * | 12/2021 | ............. G06Q 50/06 |
| WO | 2020165509 A1 | | 8/2020 | |

OTHER PUBLICATIONS

J. Van Roy, N. Leemput, F. Geth, R. Salenbien, J. Büscher and J. Driesen, "Apartment Building Electricity System Impact of Operational Electric Vehicle Charging Strategies," in IEEE Transactions on Sustainable Energy, vol. 5, No. 1, pp. 264-272, Jan. 2014 (Year: 2014).*

G. Abdelaal, M. I. Gilany, M. Elshahed, H. M. Sharaf and A. El'gharably, "Integration of Electric Vehicles in Home Energy Management Considering Urgent Charging and Battery Degradation," in IEEE Access, vol. 9, pp. 47713-47730, 2021 (Year: 2021).*

S. Mateen, A. Haque, V. S. B. Kurukuru and M. A. Khan, "Discrete Stochastic Control for Energy Management With Photovoltaic Electric Vehicle Charging Station," in CPSS Transactions on Power Electronics and Applications, vol. 7, No. 2, pp. 216-225, Jun. 2022. (Year: 2022).*

\* cited by examiner

VEHICLE BATTERY LIFE MANAGEMENT FOR ENERGY SOLUTIONS

BACKGROUND

Advancements in energy management have led to development of various solutions that improve energy consumption and utilization of energy sources (e.g., grid, solar, etc.) for various energy requirements of built environments such as home and office spaces. To balance demand and supply, many energy operators, especially electric utility companies follow demand-based pricing strategies and push for demand response programs that expect customers to reduce electricity usage during periods of higher demand. To avoid undesired power cuts or to reduce power consumption cost, it may be imperative for many consumers, especially homeowners to reduce their reliance on grid-based power supply, especially during hours of peak demand. An alternate power source such as a solar power unit is typically a common option to supply power to loads when the grid-based supply is inadequate or costly. However, solar power may not be reliable for many locations, especially colder regions or locations that don't receive adequate sunlight throughout the year. Another alternate source is an electric vehicle. Many electric vehicles have a battery pack with a decent battery capacity (e.g., up to 100 kWh) and a cycle rating (e.g., 2000 or more full cycles) that makes the battery last for at least a decade or more if used correctly. For many people, this presents a good option to utilize EV batteries for powering electrical loads at various locations, especially at home during a period when the vehicle is not in use or is parked. However, if used inappropriately, EV batteries may lose their cycle life due to poor power consumption practices. For example, if a battery is charged and deep discharged every day, the battery may lose a cycle every day from total cycle life, eventually reducing battery capacity and cycle life to less than what the battery is designed to be used for. Therefore, suitable battery life management may be required to maintain battery health while reducing reliance on grid-based power supply and meeting power requirements of an EV user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a system for vehicle battery life management to provide energy solutions is disclosed. The system may include circuitry communicatively coupled to a first vehicle. The circuitry may receive information associated with the first vehicle and may determine a first user of the first vehicle as one of a lessee of the first vehicle or an owner of the first vehicle. The determination may be performed based on the received information. The circuitry may set a limit that may be applicable on a consumption of charge cycles from a current cycle life of a battery unit of the first vehicle. The limit may be set based on the determination that the first user is the owner of the first vehicle. The circuitry may detect a connection of the first vehicle with an electrical system of a built environment associated with the first user. Thereafter, the circuitry may control a transfer of electric power from the battery unit to the electrical system based on the detection and the set limit.

According to another embodiment of the disclosure, a method for vehicle battery life management to provide energy solutions is disclosed. The method may include receiving information associated with a first vehicle and determining a first user of the first vehicle as one of a lessee of the first vehicle or an owner of the first vehicle. The determination may be performed based on the received information. The method may include setting a limit that may be applicable on a consumption of charge cycles from a current cycle life of a battery unit of the first vehicle. The limit may be set based on the determination that the first user is the owner of the first vehicle. The method may include detecting a connection of the first vehicle with an electrical system of a built environment associated with the first user. Thereafter, the method may include controlling a transfer of electric power from the battery unit to the electrical system based on the detection and the set limit.

According to another embodiment of the disclosure, a non-transitory computer-readable medium is provided. The non-transitory computer-readable medium may have stored thereon computer implemented instructions that, when executed by a system, causes the system to execute operations. The operations may include receiving information associated with a first vehicle and determining a first user of the first vehicle as one of a lessee of the first vehicle or an owner of the first vehicle. The determination may be performed based on the received information. The operations may include setting a limit that may be applicable on a consumption of charge cycles from a current cycle life of a battery unit of the first vehicle. The limit may be set based on the determination that the first user is the owner of the first vehicle. The operations may further include detecting a connection of the first vehicle with an electrical system of a built environment associated with the first user. Thereafter, the operations may include controlling a transfer of electric power from the battery unit to the electrical system based on the detection and the set limit.

Figure 1:
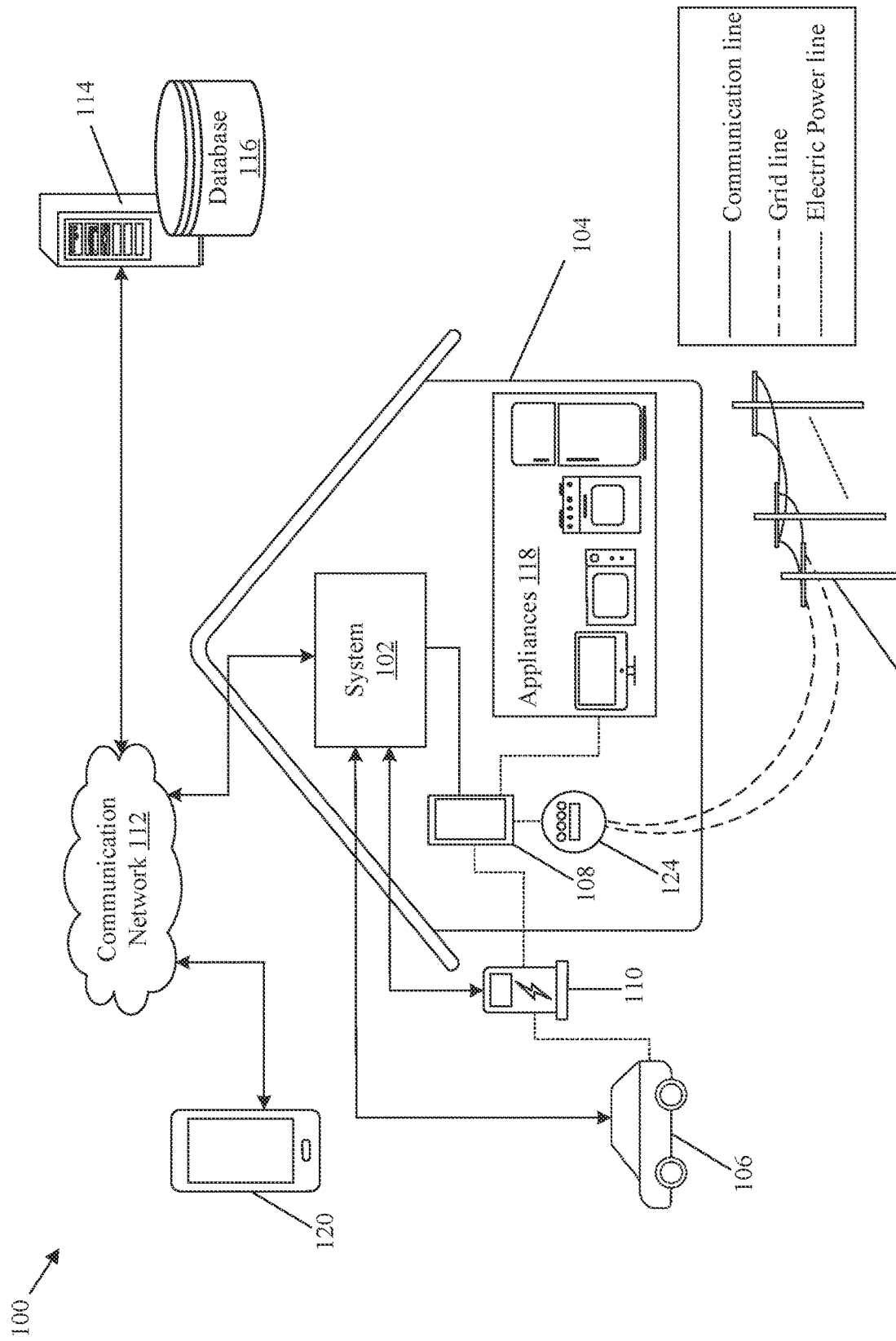
FIG. 1 is a block diagram that illustrates an exemplary network environment for vehicle battery life management, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed system and method for vehicle battery life management to provide energy solutions. Exemplary aspects of the disclosure may provide a system (such as Home Energy Management System (HEMS), Factory Energy Management System (FEMS), Building Energy Management System (BEMS), Vehicle ECU and so on) that may be communicatively coupled to a vehicle. During operation, the system may be configured to receive information (e.g., ownership details) associated with the vehicle. Based on the received information, the system may determine a user of the vehicle as one of a lessee of the vehicle or an owner of the vehicle. Upon determination, the system may set a limit that may be applicable on consumption of charge cycles from a current cycle life of a battery unit of the vehicle. By way of example, and not limitation, the limit may include a value such as a ceiling value on consumption of charge cycles (e.g., a maximum 10 cycles in a month), a ceiling value on a rate of consumption of charge cycles (e.g., 2.5 cycles per week), a ceiling on a state of charge (SOC) consumption (e.g., a maximum of 30% charge), or a ceiling over surplus power (e.g., a maximum of 2 kWh out of remaining 10 kWh). The limit may be set based on the determination that the user is the owner of the vehicle. In case the user is not the owner of the vehicle and is a lessee of the vehicle, the limit may not be set for the user of the vehicle.

At any time-instant, the system may detect a connection of the vehicle with an electrical system of a built environment (such as home, a rental property, a workshop, a business property (e.g., a restaurant owned by user), an office, or any other space) associated with the user. For example, the vehicle may be parked in a garage or at a parking lot near the built environment. Based on the detection and the set limit, the system may control a transfer of electric power from the battery unit of the vehicle to the electrical system of the built environment. While transferring, the system may perform load shedding to switch from grid-based power to power supplied by the battery unit of the vehicle. This may reduce load on the electrical grid line, especially during peak hours of demand.

Energy requirements of built environments such as homes and office spaces are typically fulfilled using power supplied from the electrical grid line. As more people will buy or lease electric vehicles (EV), energy requirements for built environments that will house such vehicles will increase. Many EV users have turned towards distributed or alternate energy sources such as solar to meet energy requirements of electrical systems of respective built environments. To manage electricity demand, respond to demand-side management, or optimize energy consumption, an energy management system may be installed in the built environment. During peak hours or in scheduled timeslots in a day or a specific period, the energy management system may support transfer of electrical power from various sources, such as from grid or off-grid sources such as solar or a battery unit of a vehicle (such as EV) connected to the electrical system of the built environment (such as a home or an office space) to reduce consumption of electric power from the electrical grid.

In some instances, a vehicle owner may overuse the battery unit for an extended period, eventually causing a deep discharge of the battery unit. In some other instances, a vehicle owner may connect too many loads at the same time, causing a quick discharge of the battery unit. If such habits are repeated frequently (e.g., daily), they may reduce the cycle life of the battery unit and force the owner to bear the cost of replacing the battery unit sooner than expected.

In contrast, the present disclosure may help to minimize poor battery usage habits by enforcing a limit on consumption of charge cycles from a current cycle life of the battery unit of the vehicle. The limit may be decided based on ownership of the EV. For example, a user may be owner of the EV or a lessee of the EV. If user is the owner of the vehicle, then any maintenance expenses (such as battery replacement, vehicle repairs etc.) may have to be paid by the owner throughout the duration of ownership. If user is a lessee, then the user may hold ownership of the EV for a limited period as per the lease agreement. To maintain battery health and to avoid incurring premature battery replacement-related expenses, the system may regulate the consumption of charge cycles of the battery unit to ensure that power from the battery unit is utilized optimally for powering electrical loads of the built environment and enough power is available for driving needs.

The present disclosure may promote energy demand management, also known as demand-side management (DSM) or demand-side response (DSR). DSM may be required to encourage a user to consume less electrical energy or use alternate source of electrical energy during periods of peak demand. By opting for load shedding and switching to battery power in place of grid-based power, the present disclosure may help to reduce consumption of power from electrical grid line and may reduce reliance of the built environment on the electrical grid. This may help electric utility companies to achieve targets for DSM. During peak hours when energy prices are high, any reduction in consumption of power from electrical grid line may help the user to reduce energy bills. Thus, techniques described in the present disclosure may encourage a user of an EV to reduce energy bills by reducing reliance on electric grid supply and adopting best practices that lead to optimal utilization of alternate energy sources, especially battery units of EVs.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for vehicle battery life management, in accordance with an embodiment of the disclosure. With reference to FIG. 1, there is shown a network environment 100. The network environment 100 includes a system 102, a built environment 104, a first vehicle 106, an electrical system 108, an electric charger 110, a communication network 112, a server 114, a database 116, appliances 118, a user device 120, an electrical grid line 122, and an electric power meter 124. The system 102 may communicate with the user device 120 and the server 114 through the communication network 112. The system 102 may be communicatively and electrically coupled with the first vehicle 106, the electrical system 108, and the electric charger 110.

The system 102 may include suitable logic, circuitry, interfaces, and/or code that may be configured to measure energy requirements of electrical loads such as the appliances 118 of the built environment 104. Based on the requirements, the system 102 may control a transfer of electric power from a battery unit of the first vehicle 106 to the electrical system 108. The transfer may be controlled based on whether the first user of the first vehicle 106 is an owner or a lessee of the first vehicle 106. In some instances, the transfer may be controlled further based on a limit on a consumption of charge cycles from a cycle life of the battery unit. Examples of the system 102 may include, but are not limited to, Home Energy Management System (HEMS), Factory Energy Management System (FEMS), Building Energy Management System (BEMS), and an in-vehicle energy management device inside the first vehicle 106. Other examples of the system 102 may include, but are not limited to, a computing device, a desktop, a personal computer, a laptop, a computer workstation, a tablet computing device, a smartphone, a cellular phone, a mobile phone, a consumer electronic (CE) device having a display, a wearable display, or an edge device connected to a user's home network or an organization's network.

The built environment 104 may be defined as a living space or a space that may be offered to people to perform social, cultural, religious, economic, or political activities. The built environment 104 may house the system 102, the first vehicle 106, the electrical system 108, the electric charger 110, the appliances 118, and the electric power meter 124. Examples of the built environment 104 may include, but are not limited to, a residential space (such as an apartment or a house), a rental property, a workshop, and a commercial space (such as an office space, a hotel room, a concert hall, or a restaurant owned by user).

The first vehicle 106 may be an electric vehicle that houses a battery unit such as a battery pack to power electrical components of the first vehicle 106. The first vehicle 106 may be a two-wheeler vehicle, a three-wheeler vehicle, a four-wheeler vehicle, a vehicle with any number of wheels, or a vehicle that uses one or more distinct renewable power sources such as solar power or hydrogen-based fuel. Examples of the first vehicle 106 may include, but are not limited to, a hybrid electric vehicle (HEV), a battery electric vehicle (BEV), a plug-in hybrid electric vehicle (PHEV), or a vehicle with integrated photovoltaics or hydrogen fuel cells.

The electrical system 108 may be electrically coupled to the electric charger 110 and the appliances 118. The electrical system 108 may include electric circuitry to connect various power sources such as the electrical grid line 122 and the electric charger 110 to electrical loads such as the appliances 118 to control a supply of the electric power. The electric power meter 124 may be connected to the electrical system 108 (or may be a part of the electrical system 108) for measurement of power consumption. In an embodiment, the electrical system 108 may facilitate transfer of electric power from the battery unit of the first vehicle 106 to the electrical loads such as the appliances 118. In another embodiment, the electric system 108 may facilitate transfer of the electric power from the electrical grid line 122 to the first vehicle 106. Example implementations of the electrical system 108 may include, but are not limited to, a single phase, a two phase, or a three-phase circuit.

The electrical system 108 may be configured to operate in two modes, i.e., a first mode and a second mode. In the first mode, the electrical system 108 may allow a transfer of the electric power from the electrical grid line 122 or other alternate sources to the appliances 118 or to charge the battery unit of the first vehicle 106. In the second mode, the electrical system 108 may allow the transfer of the electric power from the first vehicle 106 to the appliances 118. While operating in the second mode, the system 102 may perform load shedding and supply of the electrical power from the electrical grid line 122 may be partially or wholly interrupted. For example, when the battery unit of the first vehicle 106 is used for powering the appliances 118, the electrical power from the electrical grid line 122 may be completely interrupted or partially interrupted. In case the demand for electrical power (for electrical loads such as the appliances 118) is more than what the first vehicle 106 may be able to supply, the electrical power from the electrical grid line 122 may be partially allowed to power some of the appliances 118.

The electric charger 110 may include suitable logic, circuitry, and/or interfaces that may be configured to draw power from the electrical grid line 122 or alternate energy sources (such as a photovoltaic inverter or a fuel-based genset) and may charge the first vehicle 106 using the drawn power. The electric charger 110 may be configured to control, process, and/or monitor consumption of the power used for the charging of the first vehicle 106. In some embodiments, the electric charger 110 may store the power received either from the electrical grid line 122 or the alternate energy sources and may transfer the power to the first vehicle 106. In some other embodiments, the electric charger 110 may transfer electric power from the first vehicle 106 to electrical loads such as the appliances 118 of the built environment 104. Examples of the electric charger 110 may include, but are not limited to, an electric vehicle (EV) charging station, an electric recharging point, an electronic charging station, an electric vehicle supply equipment (EVSE), a Direct Current (DC) fast charging station, a home electric charging station, a domestic electrical socket, a level 1 charging station, a level 2 charging station, or a level 3 charging station. The electric charger 110 may be present in a private location (such as a charging adapter located in a garage of the built environment 104) or a location such as a parking lot or a roadside parking space.

In FIG. 1, only one electric charger 110 is with the built environment 104. However, the disclosure may not be limited to presence of one electric charger in the built environment 104. In some embodiments, a plurality of electric chargers may be installed in the built environment 104, without a departure from the scope of the disclosure.

The communication network 112 may include a communication medium through which the system 102, the first vehicle 106, the electrical system 108, and the server 114 may communicate with each other. The communication network 112 may include one of a wired connection or a wireless connection. Examples of the communication network 112 may include, but are not limited to, the Internet, a cloud network, a Cellular or Wireless Mobile Network (such as a Long-Term Evolution and 5G New Radio), a Wireless Fidelity (Wi-Fi) network, a Personal Area Network (PAN), a Local Area Network (LAN), or a Metropolitan Area Network (MAN).

Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The server 114 may include suitable logic, circuitry, interfaces, and/or code that may be configured to receive information associated with the first vehicle 106 and usage statistics of the battery unit of the first vehicle 106. The server 114 may provide the information and the usage statistics to the user device 120. The information may be provided upon reception of requests from the user device 120 or the system 102. The server 114 may execute operations through web applications, cloud applications, HTTP requests, repository operations, file transfer, and the like. Example implementations of the server 114 may include, but are not limited to, a database server, a file server, a web server, an application server, a mainframe server, a cloud computing server, or a combination thereof.

In at least one embodiment, the server 114 may be implemented as a plurality of distributed cloud-based resources by use of several technologies that are well known to those ordinarily skilled in the art. A person with ordinary skill in the art will understand that the scope of the disclosure may not be limited to the implementation of the server 114 and the user device 120 or the server 114 and the system 102 as two separate entities. In certain embodiments, the functionalities of the server 114 can be incorporated in its entirety or at least partially in the user device 120 or the system 102, without a departure from the scope of the disclosure.

The database 116 may include suitable logic, interfaces, and/or code that may be configured to store the information associated with the first vehicle 106, the usage statistics of the battery unit of the first vehicle 106, limits that may be applicable on a consumption of charge cycles of the battery unit, and a current cycle life of the battery unit. The database 116 may be derived from data off a relational or non-relational database or a set of comma-separated values (csv) files in conventional or big-data storage. In an embodiment, the database 116 may be stored or cached on a device, such as the server 114 or the user device 120. The device storing the database 116 may be configured to receive a query for the information associated with the usage of the first vehicle 106 from the user device 120 and/or the set of user devices 120. In response, the server 114 or the database 116 may be configured to retrieve and provide the queried information associated with the usage of the first vehicle 106 and the information associated with limits that is applicable on a consumption of charge cycles, and current cycle life of the battery unit of the first vehicle 106.

In some embodiments, the database 116 may be hosted on a plurality of servers stored at same or different locations. Operations of the database 116 may be executed using hardware including a processor, a microprocessor (e.g., to perform or control performance of one or more operations), a field-programmable gate array (FPGA), or an application-specific integrated circuit (ASIC). In some other instances, the database 116 may be implemented using software.

The appliances 118 may include small appliances, major appliances, or consumer electronics. Small appliances may include small household electrical machines. Another category may include kitchen appliances such as juicers, electric mixers, meat grinders, coffee grinders, deep fryers, herb grinders, food processors, electric kettles, coffee makers, blenders and dough blenders, rice cookers toasters and exhaust hoods, and the like. The major appliances may include air conditioners, dishwashers, clothes dryers, drying cabinets, freezers, refrigerators, kitchen stoves, water heaters, washing machines, trash compactors, microwave ovens, and induction cookers, and the like. Consumer electronics may include devices intended for entertainment, communications, recreation, and the like. The consumer goods may be meant for housekeeping tasks, such as washing machines and refrigerators. Some of the appliances include home electronics, radio receivers, TV sets, CD, VCRs and DVD players, digital cameras, camcorders, still cameras, clocks, alarm clocks, computers, video game consoles, HiFi and home cinema, and the like.

The user device 120 may include suitable logic, circuitry, interfaces, and/or code that may be configured to display a user interface (UI) that renders usage statistics of the battery unit of the first vehicle 106. By way of example, and not limitation, the usage statistics may include at least one of a current State of Charge (SOC) of the battery unit of the first vehicle 106, a current cycle life of the battery unit of the first vehicle 106, a saving estimate in terms of charge cycles of the battery unit of the first vehicle 106, a reduction in a consumption of grid power due to the transfer of the electric power to the electrical system 108, an amount of the electric power that may be transferred to the electrical system 108 from the battery unit, an average power saving for the built environment 104 over a period, or a monetary saving value associated with at least one of the saving estimate, the reduction in the consumption of the grid power, or the average power saving. Examples of the user device 120 may include, but are not limited to, a computing device, a desktop, a personal computer, a laptop, a computer workstation, a tablet computing device, a smartphone, a cellular phone, a mobile phone, a consumer electronic (CE) device having a display, a television (TV), a wearable display, a head mounted display, a digital signage, a digital mirror (or a smart mirror), a video wall (which consists of two or more displays tiled together contiguously or overlapped in order to form one large screen), or an edge device connected to a user's home network or an organization's network.

The electrical grid line 122 may be configured to supply electric power from a power generation unit (such as a power plant) to electrical devices (such as the electric charging facility device or other electrical appliances). The electrical grid line 122 may be a managed network of high voltage (HV) power transmission lines, sub-stations, low voltage (LV) distribution lines, and generation facilities (such as power plants). The electrical grid line 122 may include multiple components, such as high-voltage power lines and low-voltage power lines with distribution transformer that may connect one or more power plants to the built environment 104 across a pre-defined area (such as a state or a country).

The electric power meter 124 (or energy meter) may be used for measuring electrical power (in kilowatt hour (kWh)) consumed by electrical loads such as the appliances 118 and the first vehicle 106. Electric utilities may use the electric power meter 124 for billing and monitoring purposes (such as power consumption). The electrical grid line 122 may be directly connected to the electric power meter 124. Through the electrical system 108, the electric power may be distributed to the electric charger 110 or the appliances 118.

During operation, the system 102 may receive information associated with the first vehicle 106 (such as ownership details of the first vehicle 106). Based on the received information, the system 102 may determine if the first user of the first vehicle 106 is the lessee of the first vehicle 106 or the owner of the first vehicle 106. Details pertaining to the determination of the user as the lessee or the owner of the first vehicle 106 are further provided, for example, in FIG. 4.

The system 102 may set a limit that may be applicable on a consumption of charge cycles from a current cycle life of the battery unit of the first vehicle 106. The limit may be set based on the determination that the first user is the owner of the first vehicle 106. By way of example, and not limitation, the limit may include a value such as a ceiling value on consumption of charge cycles (e.g., a maximum 10 cycles in a month), a ceiling value on a rate of consumption of charge cycles (e.g., 2.5 cycles per week), a ceiling on a state of charge (SOC) consumption (e.g., a maximum of 30% charge), or a ceiling over surplus power (e.g., a maximum of 2 kWh out of remaining 10 kWh). In case the user is not the owner of the first vehicle 106 and is determined to be a lessee of the first vehicle 106, the limit may not be set for the user of the first vehicle 106. Details pertaining to the limit applicable on the consumption of charge cycles are further provided, for example, in FIG. 4.

At any time, the system 102 may detect a connection of the first vehicle 106 with the electrical system 108 of the built environment 104 (such as home, a rental property, a workshop, a business property (e.g., a restaurant owned by user), an office, or any other space) associated with the user. For example, the first vehicle 106 may be parked in a garage or at a parking lot associated with the built environment 104. Based on the detection and the set limit, the system 102 may control a transfer of electric power from the battery unit to the electrical system 108 of the built environment 104.

Figure 2:
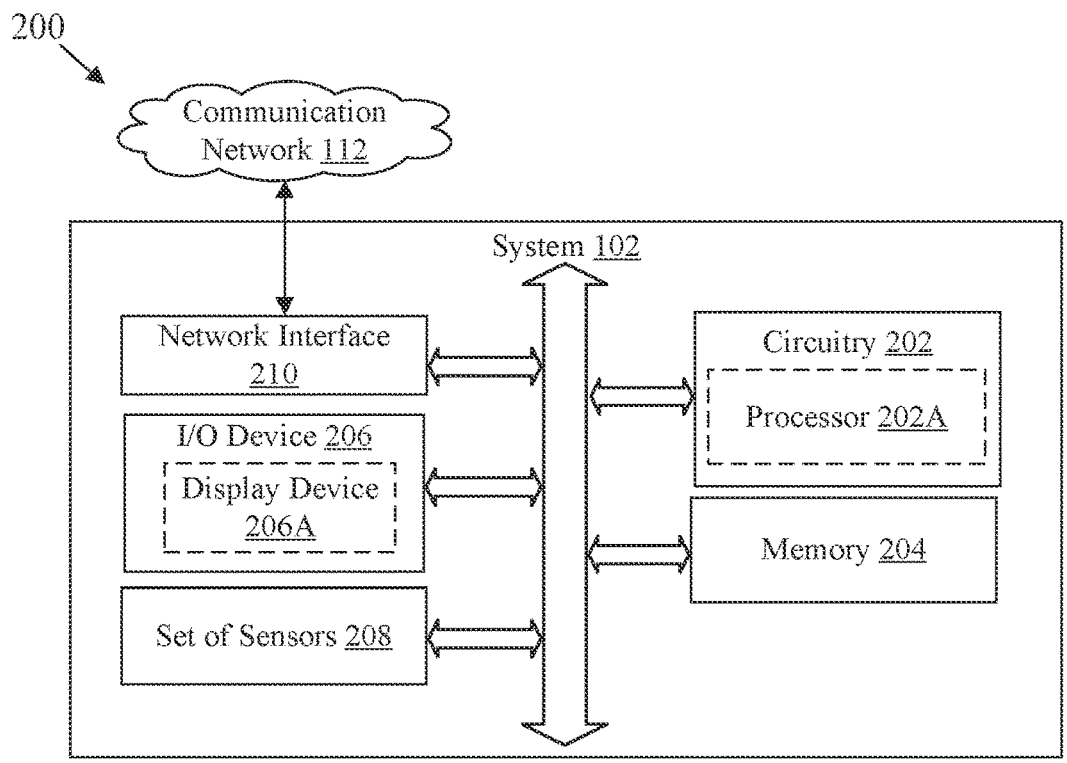
FIG. 2 is a block diagram that illustrates an exemplary system of FIG. 1, in accordance with an embodiment of the disclosure.

FIG. 2 is a block diagram that illustrates an exemplary system of FIG. 1, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, an input/output (I/O) device 206, a display device 206A, a set of sensors 208, and a network interface 210. In at least one embodiment, the I/O device 206 may also include a display device 206A. The circuitry 202 may also include a processor 202A. The circuitry 202 may be communicatively coupled to the memory 204, the I/O device 206, a set of sensors 208, and the network interface 210 through wired or wireless communication of the system 102.

A person of ordinary skill in the art will understand that the block diagram 200 of the system 102 may also include other suitable components or systems, in addition to the components or systems which are illustrated herein to describe and explain the function and operation of the present disclosure. Detailed description of such components or systems has been omitted from the disclosure for the sake of brevity.

The processor 202A may include suitable logic, circuitry, and/or interfaces code that may be configured to execute program instructions associated with different operations to be executed by the system 102. The processor 202A may include any suitable special-purpose or general-purpose computer, computing entity, or processing device including various computer hardware or software modules and may be configured to execute instructions stored on any applicable computer-readable storage media. For example, the processor 202A may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The processor 202A may include any number of processors configured to, individually or collectively, perform or direct performance of any number of operations of the user device 120, as described in the present disclosure. Examples of the processor 202A may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the program instructions executable by the processor 202A. In at least one embodiment, the memory 204 may be configured to store the information associated with the first vehicle 106. The memory 204 may be further configured to store ownership information of the first vehicle 106 (e.g., whether the first user of the first vehicle 106 is a lessee of the first vehicle 106 or an owner of the first vehicle 106). The memory 204 may be also configured to store values such as a limit that may be applicable on a consumption of charge cycles from the current cycle life of a battery unit of the first vehicle 106. The memory 204 may be also configured to store usage statistics of the battery unit. Example implementations of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include one or more input and output devices that may communicate with different components of the system 102. For example, the I/O device 206 may receive user inputs to trigger execution of program instructions associated with different operations to be executed by the user device 120. Examples of the I/O device 206 may include, but are not limited to, a touch screen, a keyboard, a mouse, a joystick, a microphone, the display device 206A, and a speaker.

The network interface 210 may include suitable logic, circuitry, and interfaces that may be configured to facilitate communication between the system 102, the first vehicle 106, the server 114, and the user device 120 via the communication network 112. The network interface 210 may be implemented by use of various known technologies to support wired or wireless communication of the server 114 with the communication network 112. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

The I/O device 206 may include the display device 206A. The display device 206A may include suitable logic, circuitry, and interfaces that may be configured to receive inputs from the processor 202A to render, on a display screen, usage statistics of the battery unit of the first vehicle 106. The display device 206A may include suitable logic, circuitry, and interfaces that may be configured to receive, via the UI, a user preference associated with a usage of the battery unit of the first vehicle 106 for the electrical system 108 of the built environment 104, and wherein the limit may be set further based on the user preference. The user preference may include a state of charge (SOC) value that is to be left in the battery unit of the first vehicle 106 after the transfer of the electric power to the electrical system 108. The limit may be set further based on the SOC value and the current cycle life of the battery unit of the first vehicle 106. The display device 206A may be realized through several known technologies such as, but not limited to, at least one of a Liquid Crystal Display (LCD) display, a Light Emitting Diode (LED) display, a plasma display, or an Organic LED (OLED) display technology, or other display devices.

The set of sensors 208 may include suitable logic, circuitry, and interfaces that may be configured to monitor the appliances 118 and the electrical system 108. Example of such sensors may include, but is not limited to, voltage and current sensors; temperature sensor, proximity sensor, accelerometer, IR sensor (infrared sensor), pressure sensor, light sensor, ultrasonic sensor, smoke, gas and alcohol sensor, touch sensor, color sensor, humidity sensor, position sensor, magnetic sensor (hall effect sensor), microphone (sound sensor), tilt sensor, flow sensor, level sensor, PIR sensor, touch sensor, and strain and weight sensor.

Figure 3:
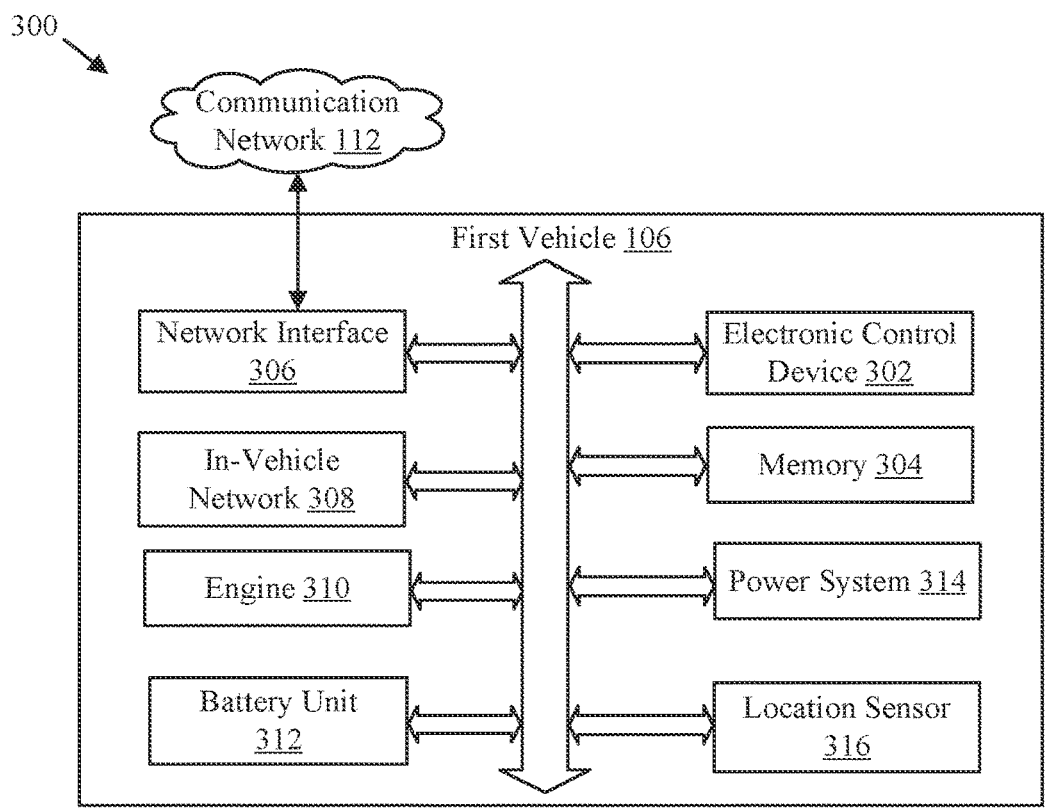
FIG. 3 is a block diagram that illustrates an exemplary vehicle of FIG. 1, in accordance with an embodiment of the disclosure.

FIG. 3 is a block diagram that illustrates an exemplary vehicle of FIG. 1, in accordance with an embodiment of the disclosure. FIG. 3 is explained in conjunction with elements from FIG. 1 and FIG. 2. With reference to FIG. 3, there is shown a block diagram 300 of the first vehicle 106. The first vehicle 106 may include an electronic control device 302, a memory 304, a network interface 306, an in-vehicle network 308, an engine 310, a battery unit 312, a power system 314, and a location sensor 316.

The electronic control device 302 may include suitable logic, circuitry, interfaces, and/or code that may be configured to monitor usage of the first vehicle 106. The electronic control device 302 may be a specialized electronic circuitry that may include an electronic control unit (ECU) processor to control different functions, such as, but not limited to, engine operations, communication operations, and data acquisition of the first vehicle 106. The electronic control device 302 may store information associated with the first vehicle 106 and may transmit such information to the system 102 based on requirements. In an embodiment, the electronic control device 302 may determine usage statistics associated with the battery unit 312 of the first vehicle 106 One example implementation of the electronic control device 302 can be a microprocessor. Other examples of the electronic control device 302 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable CE device, a server, and other computing devices.

The memory 304 may include suitable logic, circuitry, interfaces, and/or code that may be configured to store a set of instructions executable by the electronic control device 302. In at least one embodiment, the memory 304 may be configured to store the information associated with the first vehicle 106 and usage statistics associated with the battery unit 312 of the first vehicle 106. Examples of implementation of the memory 204 may include, but are not limited to, RAM, ROM, a HDD, an SSD, a CPU cache, and/or a SD card.

The network interface 306 may include suitable logic, circuitry, and interfaces that may be configured to facilitate communication between the electronic control device 302 and the various devices or components of the network environment 100 (such as the user device 120 and the server 114), via the communication network 112. The network interface 306 may be implemented by use of various known technologies to support wired or wireless communication of the first vehicle 106 with the communication network 112. The network interface 306 may include, but is not limited to, an antenna, a RF transceiver, one or more amplifiers, a tuner, one or more oscillators, a digital signal processor, a CODEC chipset, a SIM card, or a local buffer circuitry. The network interface 306 may be configured to communicate via wireless communication with networks, such as the Internet, an Intranet, or a wireless network, such as a cellular telephone network, a wireless LAN, and a MAN. The wireless communication may be configured to use one or more of a plurality of communication standards, protocols, and technologies, such as GSM, EDGE, W-CDMA, LTE, 5G NR, CDMA, TDMA, Bluetooth, Wi-Fi (such as IEEE 802.11a, IEEE 802.11b, IEEE 802.11g or IEEE 802.11n), VoIP, Li-Fi, Wi-MAX, a protocol for email, instant messaging, and a SMS.

The in-vehicle network 308 may include a medium through which the electronic control device 302, the memory 304, the engine 310, the battery unit 312, the power system 314, and the location sensor 316 may communicate with each other. In accordance with an embodiment, in-vehicle communication of audio/video data may occur by use of Media Oriented Systems Transport (MOST) multimedia network protocol of the in-vehicle network 308 or other suitable network protocols for vehicle communication. The MOST-based network may be a separate network from the controller area network (CAN). The MOST-based network may use a plastic optical fiber (POF) medium. In accordance with an embodiment, the MOST-based network, the CAN, and other in-vehicle networks may co-exist in a vehicle, such as the first vehicle 106. The in-vehicle network 308 may facilitate access control and/or communication between the electronic control device 302 and other ECUs, such as ECM or a telematics control unit of the first vehicle 106.

Various devices or components in the first vehicle 106 may connect to the in-vehicle network 308, in accordance with various wired and wireless communication protocols. Examples of the wired and wireless communication protocols for the in-vehicle network 308 may include, but are not limited to, cellular Vehicle-to-Everything (C-V2X) communication, Dedicated Short-Range Communication (DSRC), a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (I$^2$C), Inter Equipment Bus (IEBus), Society of Automotive Engineers (SAE) J1708, SAE J1939, International Organization for Standardization (ISO) 11992, ISO 11783, MOST, MOST25, MOST50, MOST150, Plastic optical fiber (POF), Power-line communication (PLC), Serial Peripheral Interface (SPI) bus, and/or Local Interconnect Network (LIN).

The engine 310 may operate only on stored electricity and may include one or more electric motors (either alternating current [AC] or direct current [DC]), and a controller to manage the power electronics. Compared with ICEs, which deliver their peak torque within a limited range of engine rpm, the electric motor can deliver a constant and high torque over a broad range of speeds from zero mph; thus, most EVs neither need a reduction gearbox nor do they require the increasingly complex engine management systems that have been added to ICEs and their transmissions to comply with emissions legislation while retaining drivability. As a result, the complete EV drivetrain may be less complex compared to conventional vehicles with ICE. A description of various parts of the engine 310 has been omitted from the disclosure for the sake of brevity.

The battery unit 312 may be a source of electric power for one or more electric circuits or loads in the first vehicle 106. For example, the battery unit 312 may be a source of electrical power to the electronic control device 302, the memory 304, the network interface 306, the in-vehicle network 308, the engine 310, the power system 314, and the location sensor 316. The battery unit 312 may correspond to a battery pack that includes a specific arrangement of multiple batteries. Such batteries are typically surrounded by a suitable coolant and a charge controller. Examples of the battery unit 312 may include, but are not limited to, a lead acid battery, a nickel cadmium battery, a nickel—metal hydride battery, a lithium-ion battery, a sodium ion battery, and other forms of rechargeable batteries.

The power system 314 may include suitable logic, circuitry, interfaces, and/or code that may be configured to control output of electric power to various electric circuits and loads of the first vehicle 106. The power system 314 may utilize the battery to provide the electric power to perform various electrical operations of the first vehicle 106. The power system 314 may provide the electric power for functioning of different components (such as the electronic control device 302, the memory 304, the network interface 306, the in-vehicle network 308, the engine 310, the battery unit 312, the power system 314, and the location sensor 316) of the first vehicle 106. In some instances, the power system 314 may be configured to receive control signals from the electronic control device 302 to control the various electric circuits and loads of the first vehicle 106. The power system 314 may be configured to control the charging and the discharging of the battery unit 312 based on the received control signals. Examples of the power controller may include, but are not limited to, an electric charge/discharge controller, a charge regulator, a battery regulator, a battery management system, an electric circuit breaker, a power electronic drive control system, an Application-Specific Integrated Circuit (ASIC) processor, and/or other power-control hardware processors.

The location sensor 316 may include suitable logic, circuitry, and/or interfaces that may be configured to determine a current geo-location of the first vehicle 106. Examples of the location sensor 316 may include, but are not limited to, a Global Navigation Satellite System (GNSS)-based sensor of the first vehicle 106. Examples of the GNSS-based sensor may include, but are not limited to, global positioning sensor (GPS), Global Navigation Satellite System (GLONASS), or other regional navigation systems or sensors.

Figure 4:
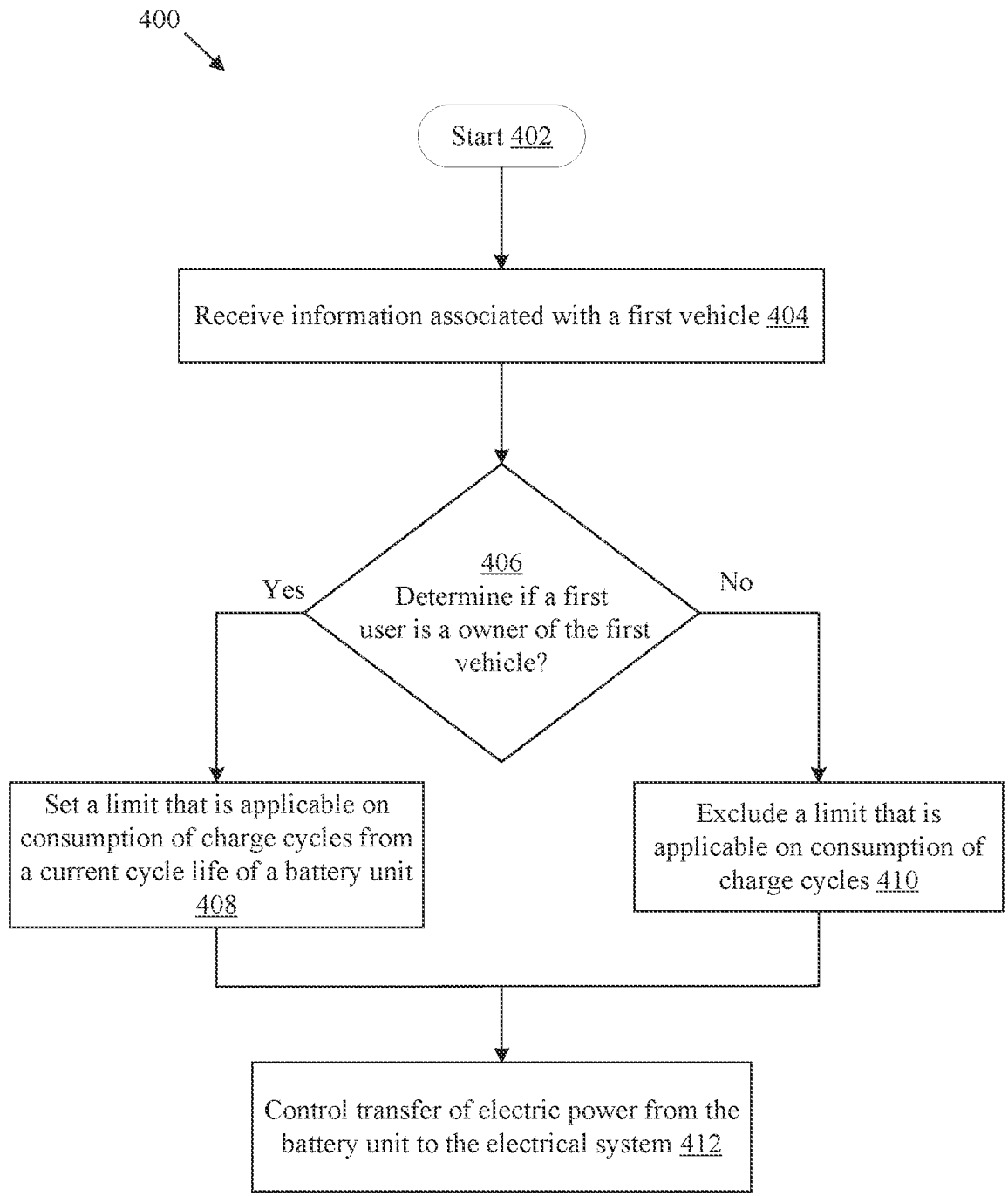
FIG. 4 is a flowchart that illustrates exemplary control of electric power transfer from a battery unit of a vehicle to an electrical system of a built environment, in accordance with an embodiment of the disclosure.

FIG. 4 is a flowchart that illustrates exemplary control of electric power transfer from a battery unit of a vehicle to an electrical system of a built environment, in accordance with an embodiment of the disclosure. FIG. 4 is explained in conjunction with elements from FIG. 1, FIG. 2, and FIG. 3. With reference to FIG. 4, there is shown an exemplary flowchart 400 that provides operations from 404 to 412, as described herein. The operations may start at 402 and proceed to 404.

At 404, information associated with the first vehicle 106 may be received. The first vehicle 106 may be communicatively coupled with the processor 202A. The processor 202A may be configured to receive the information associated with the first vehicle 106. The information associated with the first vehicle 106 may include, for example, vehicle identifiers such as vehicle registration number, vehicle identification number (VIN), a unique code assigned to the first vehicle 106 to uniquely identify the vehicle model and a technical specification of the first vehicle 106. Additionally, or alternatively, the information may include ownership or lease details of the first vehicle 106. Such details may help to identify whether the current user of the first vehicle 106 is an owner, co-owner, a lessee, or a co-lessee of the first vehicle 106.

At 406, it may be determined whether the first user is the owner of the first vehicle 106 or the lessee of the first vehicle 106. The determination may be performed based on the received information. By way of example, and not limitation, the processor 202A may compare the received information associated with the first vehicle 106 with ownership data that may be stored on the server 114 (i.e., the database 116). The comparison may be performed to identify whether the first user is the owner or the lessee (i.e., whether the first vehicle 106 is on lease or not). The ownership data may include unique identifiers associated with different vehicles and respective users. Additionally, or alternatively, the ownership data may include a list of vehicles, owner or lessee information for the vehicles, and details such as an ownership period, a lease period, a date of purchase or lease, license and registration details, insurance details, and usage data (e.g., average number of miles traveled per day or in a defined period, a charging frequency, and the like). In some instances, load requirements (in terms of kWh or units) and energy usage pattern for a day or a particular duration in day may be identified for the built environment 104. The load requirements and the energy usage pattern may be required to identify a schedule that may be used to execute load shedding (of grid-based power supply) for the electrical system 108 of the built environment 104 and to switch to power supply from the battery unit 312 of the first vehicle 106.

In an exemplary scenario, a query may be sent by the processor 202A to the server 114 to determine if the first user is the owner of the first vehicle 106. The query may include identifiers of the first user and the first vehicle 106 (extracted from the received information associated with the first vehicle 106). Based on the query, a database search may be performed to lookup ownership details of the first user in the database 116. The result of the search may indicate whether a record pertaining to ownership or lease of the first vehicle 106 exists in the database 116 and whether the first user is a legal owner or a legal lessee of the first vehicle 106.

In case it is determined that the first user is the owner of the first vehicle 106, control may pass to 408. Otherwise, control may pass to 410.

At 408, a limit may be set on usage of the battery unit 312 of the first vehicle 106 for applications such as a Vehicle-to-Home (V2H) application, a Vehicle-to-Load (V2L), or a Vehicle-to-Grid (V2G) application. In some instances, the built environment 104 may be equipped with a bidirectional charging equipment that may control transfer of electric power to and from the battery unit 312 of the first vehicle 106. In such instances, the limit may be set to control operations of such a charging equipment and the electrical system 108 of the built environment 104. The limit may be applicable on a consumption of charge cycles from a current cycle life of the battery unit 312 of the first vehicle 106. Based on a determination that the first user is the owner of the first vehicle 106, the processor 202A may set a limit such as a ceiling value on the consumption of charge cycles (e.g., a maximum of 100 cycles out of a cycle rating of 3000 cycles), a ceiling value on a rate of consumption (e.g., a maximum of 2 cycles per week), a ceiling on a state of charge (e.g., a maximum of 30% charge consumption while keeping a minimum balance charge of 30% at any time), or a ceiling over surplus power (e.g., a maximum of 2 kWh out of remaining 10 kwh of usable battery capacity).

At 410, the limit applicable on the consumption of the charge cycles may be excluded for the first user. The set limit may be excluded based on the determination that the first user is the lessee. If the first vehicle 106 is on lease, the cost of battery maintenance or battery replacement may be covered under lease agreement. In some cases, the lessee may not be liable or responsible to bear charges of battery maintenance or replacement. Therefore, it may not be imperative or desirable to set any limit on the consumption of charge cycles from a current cycle life of the battery unit 312. In an embodiment, an option may be provided to the lessee to request a limit on consumption of charge cycles for powering electrical loads (other than vehicle components) of the built environment 104.

At 412, a transfer of electric power from the battery unit 312 to the electrical system 108 may be controlled. Based on the limit set on consumption of charge cycles, the processor 202A may control transfer of electric power from the battery unit 312 of the first vehicle 106 to the electrical system 108.

Before the transfer, the processor 202A may signal one or more components of the electrical system 108 to execute load shedding fora defined duration (e.g., 1 hour). In that duration, any transfer of power from the electrical grid line 122 to the electrical system 108 may be limited to few loads or completely interrupted. During load shedding, the transfer may be controlled by signaling the first vehicle 106 to enable power transfer to electrical loads (includes the appliances 118) via the electrical system 108. In an embodiment, the transfer may occur via the electric charger 110 (with bidirectional charging capability) that may convert DC output of the battery unit 312 to AC output which meets standard power supply requirements. Alternatively, the conversion may be performed by an inverter system integrated into the first vehicle 106

The processor 202A may be configured to control or signal the electric charger 110 to manage transfer of electric power between the battery unit 312 and the electrical system 108. For example, the processor 202A may control the electric charger 110 to transfer the electric power from the battery unit 312 to the electrical system 108 from the electrical system 108 to the battery unit 312. Alternatively, the processor 202A may control the electrical charger 110 and the electrical system 108 to selectively transfer the electric power from the battery unit 312 to specific electrical loads of the built environment 104. For instance, while the battery unit 312 may power lighter devices such as lighting fixtures and display devices, a portion of grid-based power may be supplied to heavier loads such as air conditioners or electric heaters. The processor 202A may also control the electric charger 110 to interrupt transfer of the electric power to certain loads, if required.

In accordance with an embodiment, the first ceiling value may be checked for setting a limit, based on determination that the first user is the owner of the first vehicle 106. The first ceiling value may be applicable over a consumption of the charge cycles from the current cycle life of the battery unit 312 of the first vehicle 106. The first ceiling value may be selected to ensure that the value remains less than the current cycle life of the battery unit 312. During operation, the first ceiling value may be compared with the consumption of charge cycle of the battery unit 312. Based on the comparison, the transfer of the electric power from the battery unit 312 to the electrical system 108 may be controlled such that the consumption of the charge cycles remains less than or equal to the first ceiling value. For example, the first ceiling value may be determined to be 20 cycles out of current cycle life of 2000 cycles. If it is determined that the consumption of the charge cycle is 15 cycles (5 less than the ceiling value of 20 cycles), the transfer of electric power from the battery unit 312 to the electrical system 108 may not be interrupted. When the consumption of the charge cycle reaches or almost breaches the first ceiling value, the transfer of electric power from the battery unit 312 to the electrical system 108 may be interrupted.

In accordance with an embodiment, the second ceiling value may be checked for setting a limit, based on a determination that the first user is the owner of the first vehicle 106. The second ceiling value may be applicable over a rate of consumption of the charge cycles from the current cycle life of the battery unit 312 of the first vehicle 106. During operation, the second ceiling value may be compared with a current rate of consumption of the charge cycle of the battery unit 312. Based on the comparison, the transfer of the electric power from the battery unit 312 to the electrical system 108 may be controlled such that the rate of consumption of the charge cycles remains less than or equal to the second ceiling value. For example, the processor 202A may determine or set the second ceiling value as 2 cycles per week from a current cycle life of 200 cycles. If current rate of consumption of the charge cycle is 1.5 cycles per week, then the transfer of electric power from the battery unit 312 to the electrical system 108 may not be interrupted. While allowing the transfer, the system 102 may ensure that the first vehicle 106 is not deep discharged and SOC (% charge) of the battery unit 312 remains above a threshold (e.g., 30% or above) at any time instant. If the rate of consumption of the charge cycle reaches or almost breaches the second ceiling value, then the transfer of electric power from the battery unit 312 to the electrical system 108 may be interrupted.

In accordance with an embodiment, the third ceiling value may be checked for setting a limit, based on a determination that the first user is the owner of the first vehicle 106. The third ceiling value may be applicable over a surplus amount of electric power that may be left in the battery unit 312 of the first vehicle 106 at any time instant. During operation, the third ceiling value may be compared with the surplus amount of electric power and the transfer of electric power from the battery unit 312 to the electrical system 108 may be controlled based on the comparison. The control may be performed such that the surplus amount of electric power in the battery unit 312 remains less than or equal to the third ceiling value at any time instant. For example, the processor 202A may be configured to determine the third ceiling value as 10 kWh per day from a surplus of 30 kWh that may be left in the battery (rated at 100 kWh). If it is determined that the surplus amount of electric power in the battery unit 312 is 15 kWh at a time-instant, the transfer of electric power from the battery unit 312 to the electrical system 108 may not be interrupted. When the surplus amount of electric power in reaches or almost breaches the third ceiling value, the transfer of electric power from the battery unit 312 to the electrical system 108 may be interrupted.

In accordance with an embodiment, the fourth ceiling value may be checked for setting a limit, based on a determination that the first user is the owner of the first vehicle 106. The fourth ceiling value may correspond to a residual state of charge (SOC) that may be left in the battery unit 312 of the first vehicle 106. The fourth ceiling value may be compared with the residual SOC that may be left in the battery unit 312 of the first vehicle 106. Based on the comparison, the transfer of the electric power from the battery unit 312 to the electrical system 108 may be controlled such that the residual SOC in the battery unit 312 of the first vehicle 106 remains less than or equal to the fourth ceiling value. For example, the processor 202A may determine the fourth ceiling value as 40% (which must be remain available for next trip). If, while supplying power to electrical system 108, the residual SOC is determined to be 45% in the battery unit 312 (i.e., less than the fourth ceiling value), then the transfer of electric power from the battery unit 312 to the electrical system 108 may not be interrupted. When the residual SOC reaches or almost breaches the fourth ceiling value, the transfer of the electric power from the battery unit 312 to the electrical system 108 may be interrupted. Setting of the limit, as described in the foregoing description, may help to ensure that the battery unit 312 is not overused for transferring electric power to the electrical loads such as the appliances 118 and the battery unit 312 remains healthy or usable for a defined duration (e.g., a battery life (in years) or a warranty period for battery packs).

In an embodiment, the processor 202A may be communicatively coupled to a second vehicle (not shown). The second vehicle may be an electric vehicle that a second user may own. Both the second vehicle and the first vehicle 106 may be parked inside a parking space of the built environment 104 and may be capable of delivering of power to electrical system 108 at same or different time durations. During operation, the processor 202A may determine the second user of the second vehicle as one of a lessee of the second vehicle or an owner of the second vehicle. Upon determination that the second user is the owner of the second vehicle, the processor 202A may set a limit that may be applicable on a consumption of charge cycles from a current cycle life of a battery unit of the second vehicle. The limit may be set based on a determination that the second user is the owner of the second vehicle. Thereafter, the processor 202A may control a transfer of electric power from the battery unit 312 to the electrical system 108 based on the detection and the set limit. In accordance with an embodiment, the processor 202A may determine a current cycle life of a battery unit of the second vehicle. Based on the current cycle life, the limit on consumption of charge cycles from battery units of both vehicles (i.e., first and second vehicles) may be set.

Figure 5:
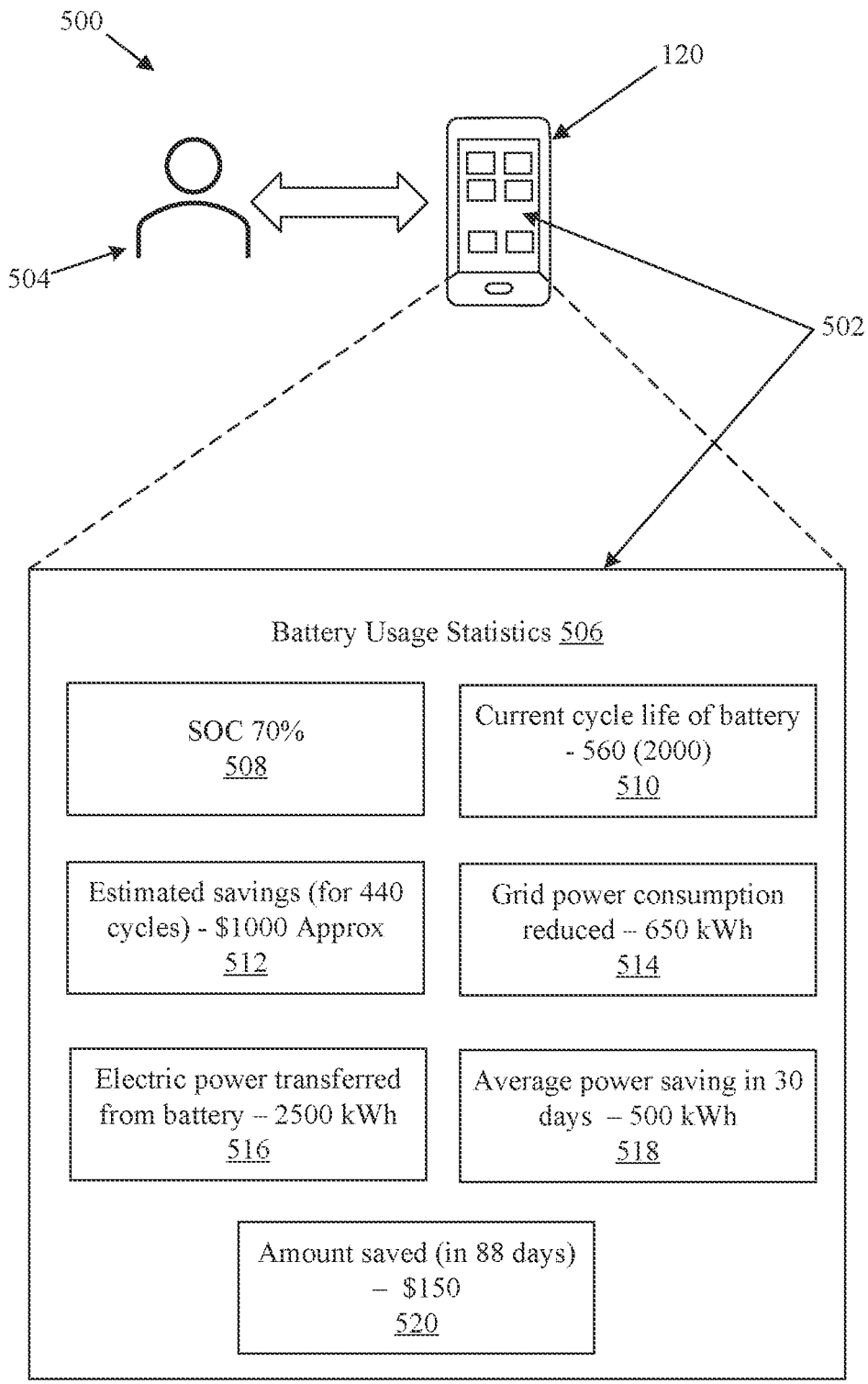
FIG. 5 is a diagram that illustrates an exemplary user device of FIG. 1 to display usage statistics of a battery unit, in accordance with an embodiment of the disclosure.

FIG. 5 is a diagram that illustrates an exemplary user device of FIG. 1 to display usage statistics of a battery unit, in accordance with an embodiment of the disclosure. FIG. 5 is explained in conjunction with elements from FIG. 1, FIG. 2, FIG. 3, and FIG. 4. With reference to FIG. 5, there is shown diagram 500 of an exemplary UI that displays battery usage statistics.

During operation, the processor 202A may control the user device 120 to display a UI 502 that includes battery usage statistics 506 of the battery unit 312 of the first vehicle 106. The battery usage statistics 506 may include a current SOC 508 of the battery unit 312 of the first vehicle 106. As shown, for example, 70% SOC' may correspond to a current residual SOC that may be left in the battery unit 312. The battery usage statistics 506 may further include a current cycle life 510 of the battery unit 312 of the first vehicle 106. For example, a value of '560 (2000)' on the UI 502 is shown to indicate that the battery unit 312 of the first vehicle 106 has a cycle life of 560 cycles and a total cycle life (i.e., a cycle rating) of the battery unit 312 may be 2000 cycles (i.e., 2000 full discharge to full charge cycles).

The battery usage statistics 506 may further include an estimated saving 512 i.e., a saving estimate in terms of charge cycles of the battery unit 312 of the first vehicle 106. For example, an estimated saving of 440 cycles is shown on the UI 502 to indicate a reduction in consumption of power supplied by the electrical grid line 122. The reduction may be equivalent to a monetary saving of roughly 1000 USD. The battery usage statistics 506 may also include a statistic to indicate a reduction in grid power consumption 514. The reduction in consumption of the electrical grid line 122 power may be due to controlled load shedding and transfer of the electric power from the battery unit 312 to the electrical system 108 for a duration of the load shedding. For example, a value of 650 kWh is shown on the UI 502 to encourage the first user to continue using the battery unit for power requirements of the built environment 104.

The battery usage statistics 506 may further include a value to indicate an amount of electric power transferred from battery unit to the electrical system 108. An example value 516 of 2500 kWh of electric power is shown on the UI 502. The battery usage statistics 506 may also include an average power saving for a period 518 such as last 30 days. As shown, an average power saving for the built environment 104 over the period 518 (i.e., last 30 days) may be 500 kWh. The battery usage statistics 506 may also include a saving amount 520. Therefore, "Amount saved (in 88 days)—$150" may mean that a total of $150 amount is saved over a period of 88 days.

During operation, the processor 202A may receive a preference of a user 504. The preference may be associated with a usage of the battery unit 312 of the first vehicle 106 for the electrical system 108 of the built environment 104. The user preference may be received via the UI 502 of the user device 120. By way of example, and not limitation, the user preference may include an SOC value that must remain in the battery unit 312 of the first vehicle 106 after the transfer of the electric power to the electrical system 108 through the electric charger 110. The limit may be set based on the SOC value specified in the user preference and a current cycle life of the battery unit 312 of the first vehicle 106.

Figure 6:
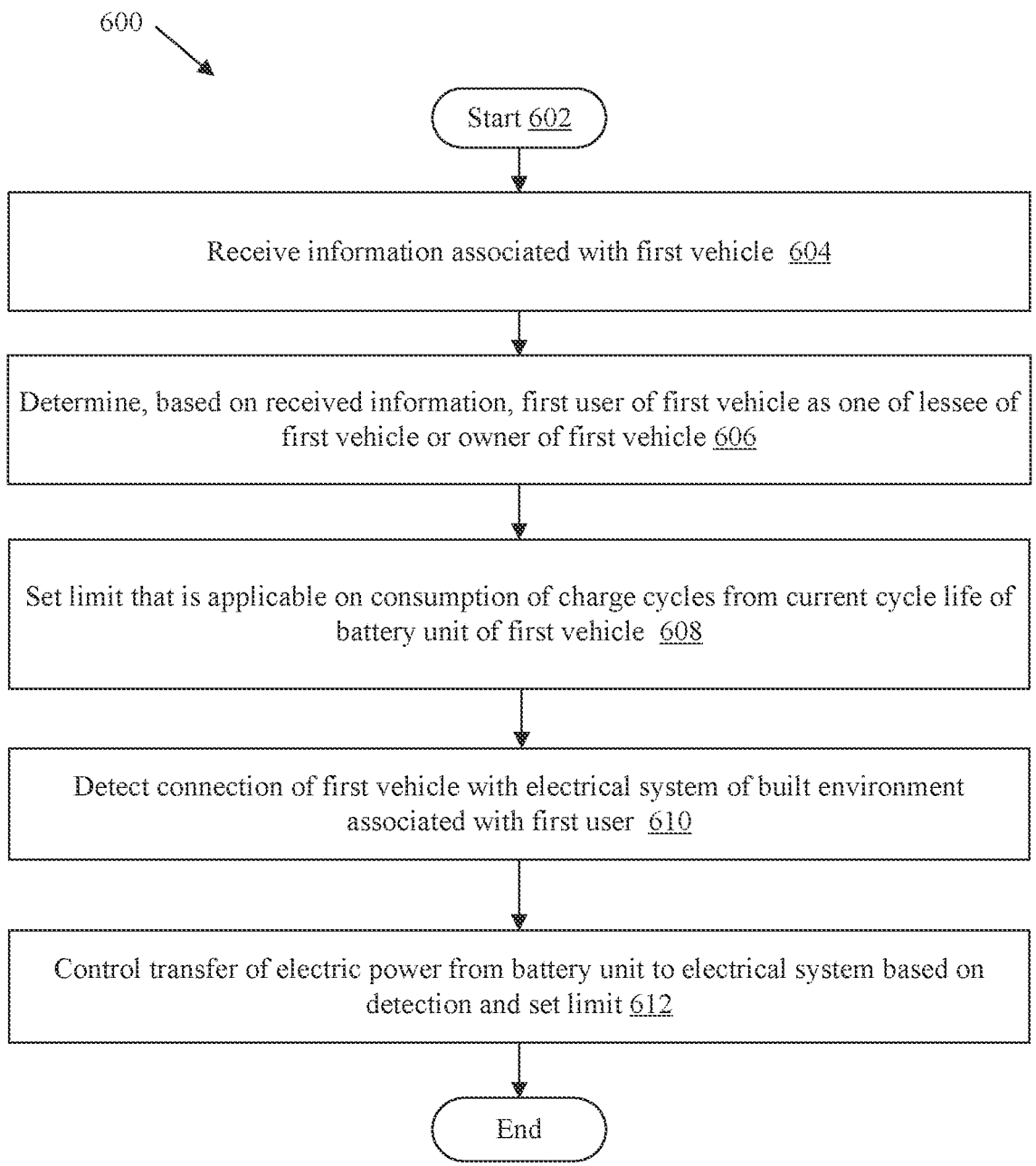
FIG. 6 is a flowchart that illustrates exemplary operations for vehicle battery life management, in accordance with an embodiment of the disclosure, in accordance with an embodiment of the disclosure.

FIG. 6 is a flowchart that illustrates exemplary operations for vehicle battery life management, in accordance with an embodiment of the disclosure. With reference to FIG. 6, there is shown a flowchart 600. The flowchart 600 is described in conjunction with FIGS. 1, 2, 3, 4, 5, and 6. The operations from 602 to 612 may be implemented, for example, by the system 102 of FIG. 1 or the processor 202A of FIG. 2. The operations of the flowchart 600 may start at 602 and proceed to 604.

At 604, information associated with the first vehicle 106 may be received. In one or more embodiment, the processor 202A may be configured to receive the information associated with the first vehicle. Details about the receiving of the information associated with first vehicle 106 are provided, for example, in FIG. 4 (at 404).

At 606, a user of the first vehicle 106 may be determined as a lessee of the first vehicle 106 or an owner of the first vehicle 106. In one or more embodiments, the processor 202A may be configured to determine if the first user of the first vehicle 106 is the lessee of the first vehicle 106 or the owner of the first vehicle 106, based on the received information.

At 608, a limit applicable on a consumption of charge cycles from a current cycle life of a battery unit 312 of the first vehicle 106 may be set. The limit may be set based on the determination that the first user is the owner of the first vehicle 106. In one or more embodiments, the processor 202A may be configured to set the limit. Details about the setting of the limit are provided, for example, in FIG. 5.

At 610, a connection of the first vehicle 106 with the electrical system 108 of the built environment 104 may be detected. In one or more embodiments, the processor 202A may detect the connection of the first vehicle 106 with the electrical system 108 of the built environment 104.

At 612, the transfer of electric power from the battery unit 312 to the electrical system 108 may be controlled based on the detection and the set limit. In one or more embodiments, the processor 202A may control the transfer of electric power from the battery unit 312 to the electrical system 108, based on the detection and the set limit. Details about the transfer of electric power from the battery unit 312 to the electrical system 108 are provided, for example, in FIG. 4 (at 410). Control may pass to end.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A system, comprising:
   circuitry communicatively coupled to a first vehicle, wherein the circuitry:
      receives information associated with the first vehicle;
      determines, based on the received information, a first user of the first vehicle as one of a lessee of the first vehicle or an owner of the first vehicle;
      controls a user device to display a user interface (UI);
      receives, via the UI, a user preference associated with a usage of a battery unit of the first vehicle for an electrical system of a built environment;
      sets a limit that is applicable on a consumption of charge cycles from a current cycle life of the battery unit of the first vehicle,
         wherein the limit is set based on the determination that the first user is the owner of the first vehicle and based on the user preference;
      excludes the set limit that is applicable on the consumption of the charge cycles, wherein the set limit is excluded based on the determination that the first user is the lessee;
      detects a connection of the first vehicle with the electrical system of the built environment associated with the first user; and
      controls a transfer of electric power from the battery unit to the electrical system based on the detection and the set limit.

2. The system according to claim 1, wherein the limit includes a first ceiling value over the consumption of the charge cycles from the current cycle life,
   wherein the first ceiling value is less than the current cycle life, and the transfer of the electric power is controlled such that the consumption of the charge cycles is less than or equal to the first ceiling value.

3. The system according to claim 1, wherein the limit includes a second ceiling value over a rate of the consumption of the charge cycles from the current cycle life of the battery unit, and
   wherein the transfer of the electric power is controlled such that the rate of consumption is less than or equal to the second ceiling value.

4. The system according to claim 1, wherein the limit includes a third ceiling value over a surplus amount of electric power that is left in the battery unit of the first vehicle at a time-instant, and
   wherein the transfer of the electric power to the electrical system is controlled such that an amount of the electric power that is transferred to the electrical system is less than or equal to the third ceiling value.

5. The system according to claim 1, wherein the limit includes a fourth ceiling value over a residual state of charge (SOC) that is left in the battery unit of the first vehicle, and
   wherein the transfer of the electric power to the electrical system is controlled such that the transfer of the electric power reduces the residual SOC to a value is less than or equal to the fourth ceiling value.

6. The system according to claim 1, wherein the circuitry further controls the user device to display the UI that further includes usage statistics of the battery unit of the first vehicle.

7. The system according to claim 6, wherein the usage statistics include at least one of:
a current State of Charge (SOC) of the battery unit of the first vehicle,
the current cycle life of the battery unit of the first vehicle,
a saving estimate in terms of charge cycles of the battery unit of the first vehicle,
a reduction in a consumption of grid power due to the transfer of the electric power to the electrical system,
an amount of the electric power that is transferred to the electrical system from the battery unit,
an average power saving for the built environment over a period, or
a monetary saving value associated with at least one of the saving estimate,
the reduction in the consumption of the grid power, or
the average power saving.

8. The system according to claim 1, wherein the user preference includes a state of charge (SOC) value that is to be left in the battery unit of the first vehicle after the transfer of the electric power to the electrical system, and
wherein the limit is set further based on the SOC value and the current cycle life of the battery unit of the first vehicle.

9. The system according to claim 1, wherein the circuitry further:
determines a second user as an owner of a second vehicle or a lessee of the second vehicle;
detects a connection of the second vehicle with the electrical system of the built environment; and
determines a current cycle life of a battery unit of the second vehicle,
wherein the limit is set further based on the current cycle life of the battery unit of the second vehicle and the determination that the second user is the owner of the second vehicle.

10. A method, comprising:
receiving information associated with a first vehicle;
determining, based on the received information, a first user of the first vehicle as one of a lessee of the first vehicle or an owner of the first vehicle;
controlling a user device to display a user interface (UI);
receiving, via the UI, a user preference associated with a usage of a battery unit of the first vehicle for an electrical system of a built environment;
setting a limit that is applicable on a consumption of charge cycles from a current cycle life of the battery unit of the first vehicle,
wherein the limit is set based on the determination that the first user is the owner of the first vehicle and based on the user preference;
excludes the set limit that is applicable on the consumption of the charge cycles, wherein the set limit is excluded based on the determination that the first user is the lessee;
detecting a connection of the first vehicle with the electrical system of the built environment associated with the first user; and
controlling a transfer of electric power from the battery unit to the electrical system based on the detection and the set limit.

11. The method according to claim 10, wherein the limit includes a first ceiling value over the consumption of the charge cycles from the current cycle life,
wherein the first ceiling value is less than the current cycle life, and
the transfer of the electric power is controlled such that the consumption of the charge cycles is less than or equal to the first ceiling value.

12. The method according to claim 10, wherein the limit includes a second ceiling value over a rate of the consumption of the charge cycles from the current cycle life of the battery unit, and
wherein the transfer of the electric power is controlled such that the rate of consumption is less than or equal to the second ceiling value.

13. The method according to claim 10, wherein the limit includes a third ceiling value over a surplus amount of electric power that is left in the battery unit of the first vehicle at a time-instant, and
wherein the transfer of the electric power to the electrical system is controlled such that an amount of the electric power that is transferred to the electrical system is less than or equal to the third ceiling value.

14. The method according to claim 10, wherein the limit includes a fourth ceiling value over a residual state of charge (SOC) that is left in the battery unit of the first vehicle, and
wherein the transfer of the electric power to the electrical system is controlled such that the transfer of the electric power reduces the residual SOC to a value is less than or equal to the fourth ceiling value.

15. The method according to claim 10, further comprising controlling the user device to display the UI that further includes usage statistics of the battery unit of the first vehicle.

16. A non-transitory computer-readable medium having stored thereon computer implemented instructions that, when executed by a system, causes the system to execute operations, the operations comprising:
receiving information associated with a first vehicle;
determining, based on the received information, a first user of the first vehicle as one of a lessee of the first vehicle or an owner of the first vehicle;
controlling a user device to display a user interface (UI);
receiving, via the UI, a user preference associated with a usage of a battery unit of the first vehicle for an electrical system of a built environment;
setting a limit that is applicable on a consumption of charge cycles from a current cycle life of the battery unit of the first vehicle,
wherein the limit is set based on the determination that the first user is the owner of the first vehicle and based on the user preference;
excludes the set limit that is applicable on the consumption of the charge cycles wherein the set limit is excluded based on the determination that the first user is the lessee;
detecting a connection of the first vehicle with the electrical system of the built environment associated with the first user; and
controlling a transfer of electric power from the battery unit to the electrical system based on the detection and the set limit.

* * * * *